(12) United States Patent
Minami et al.

(10) Patent No.: US 7,856,514 B2
(45) Date of Patent: Dec. 21, 2010

(54) STORAGE SYSTEM AND METHOD FOR CONNECTING ADDITIONAL STORAGE APPARATUS

(75) Inventors: Toshiaki Minami, Odawara (JP); Mitsuhide Sato, Oiso (JP); Kiyoshi Honda, Yokohama (JP); Masahiko Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 12/003,903

(22) Filed: Jan. 3, 2008

(65) Prior Publication Data

US 2008/0184347 A1 Jul. 31, 2008

(30) Foreign Application Priority Data

Jan. 26, 2007 (JP) ............................. 2007-015851

(51) Int. Cl.
*G06F 3/00* (2006.01)
*G06F 13/00* (2006.01)
(52) U.S. Cl. .................................. 710/15; 710/2; 710/8
(58) Field of Classification Search ........................ None
See application file for complete search history.

(56) References Cited

U.S. PATENT DOCUMENTS

2007/0255950 A1* 11/2007 Asanuma et al. ............ 713/168

FOREIGN PATENT DOCUMENTS

| JP | 04-223633 | 12/1990 |
|---|---|---|
| JP | 08-018597 | 7/1994 |

* cited by examiner

*Primary Examiner*—Tariq R. Hafiz
*Assistant Examiner*—Scott Sun
(74) *Attorney, Agent, or Firm*—Foley & Lardner LLP

(57) ABSTRACT

In a network regulated so that the unique identification information for a basic storage apparatus and that of each of a plurality of additional storage apparatuses do not overlap, the storage apparatuses can be connected to the network without being assigned unique identification information. The basic storage apparatus judges, when an additional storage apparatus is powered-on, whether or not an initial value is set in an identification information setting unit in the additional storage apparatus, the identification information setting unit being where unique identification information in the network is set. If it is judged that an initial value is set in the identification information setting unit, the basic storage apparatus enters a first mode in which it creates unique identification information, replaces the initial value with the created identification information, and recognizes the created identification information as unique identification information in the network. If it is judged that a value other than the initial value is set in the identification information setting unit, the basic storage apparatus recognizes that value as unique identification information in the network.

6 Claims, 12 Drawing Sheets

STORAGE SYSTEM AND METHOD FOR CONNECTING ADDITIONAL STORAGE APPARATUS

CROSS-REFERENCE TO RELATED APPLICATIONS

This application relates to and claims priority from Japanese Patent Application No. 2007-015851, filed on Jan. 26, 2007, the entire disclosure of which is incorporated herein by reference.

BACKGROUND

1. Field of the Invention

This invention relates to a storage system and an additional storage apparatus connecting method for the storage system, and is suitable for use, for example, for making settings to connect an additional storage apparatus to a storage system.

2. Description of Related Art

According to the SAS (Serial Attached SCSI) connection standards, each units in the hardware is obliged to have its own WWN (World Wide Name), i.e., unique identification information. Accordingly, basic storage apparatuses and additional storage apparatuses that are to be SAS-connected to each other having the same SAS-ID cannot be connected. Because of this, when attempting to connect storage apparatuses having the same SAS-ID, it has been necessary to provide each storage apparatus with a SAS-ID changing function piece of hardware, such as a rotary switch, so that connection between storage apparatuses with the same SAS-ID can be avoided. In other words, settings have been made manually to avoid the overlap of SAS-IDs for storage apparatuses connected to the same network.

The technique described below has been known as an address-setting system for a 1-N serial communication system. In this technique, each slave unit receives, upon power-on, an address setting signal from a master unit and completes address setting; the switch circuit between the slave unit and the next serially-connected slave unit is closed; accordingly, the next address setting signal from the master unit can reach that next slave unit. In this way, address setting is carried out automatically in order starting with the slave unit closest to the master unit (e.g., see Patent Document 1).

Another technique described below has been known as an address setting method. In this technique, slave units in either a serial connection line or multipoint connection line are called, starting with the one closest to the master unit. For example, in the serial connection line, when a slave unit makes a response, the master unit sends an address setting signal to that slave unit so that an address is set for that slave unit. This is repeated so that addresses are set for the slave units in the serial connection in order. As a result of setting addresses for the slave units until the slave unit at the end of the serial connection line is reached, if a response is no longer made in response to the call, the slave units in the other multipoint connection line are called, starting with the one closest to the master unit, and the master unit sends an address setting signal to slave units that responded to the call and so addresses are set for those slave units. As a result of the respective slave units in either serial connection line or multipoint connection line being called in order and addresses being set for them, address setting is carried out automatically in each slave unit, even if there are branch joints (e.g., see Patent Document 2).

[Patent Document 1] JP04-223633 A
[Patent Document 2] JP08-18597 A

An in-plant test must be performed before shipping additional storage apparatuses-to-be-SAS-connected as products. Because the test requires SAS-connecting the additional storage apparatuses to each other, it is necessary to give, as SAS-IDs for use in the in-plant test, WWNs to the additional storage apparatuses.

However, the number of steps for assigning WWNs is increasingly with the number of additional storage apparatuses, so it may result in human error in manufacturing (i.e. the in-plant test).

Moreover, there are a few additional storage apparatuses that cannot be shipped as products as a result of the in-plant test. Accordingly, giving WWNs to all the additional storage apparatuses during the in-plant test consequently includes giving WWNs to those additional storage apparatuses that cannot be shipped. This is the waste of WWN setting efforts and WWN resources.

Patent Documents 1 and 2 describe automatic address setting but do not take into consideration the waste of effort in setting addresses for in-plant tests or the prevention of human errors.

This invention has been devised in consideration of the above problems and aims to provide: a storage system where, in a network regulated so that the unique identification information for a basic storage apparatus and that for each of a plurality of additional storage apparatuses do not overlap, the storage apparatuses can be connected to the network without being assigned unique identification information, effort in setting unique identification information during in-plant tests can be conserved, and human error can be prevented; and an additional storage apparatus connecting method for the storage system.

SUMMARY

This invention provides a storage system where a basic storage apparatus and at least one additional storage apparatus are connected to each other via a network and identified by their unique identification information. In this storage system, the additional storage apparatus has an identification information setting unit where unique identification information in the network in set. The basic storage apparatus has a control unit that enters, when the additional storage apparatus is powered-on, and if an initial value is set in the identification information setting unit, a first mode in which the control unit creates unique identification information, replaces the initial value with the created identification information, and recognizes the created identification information as unique identification information in the network. Meanwhile, if a value other than the initial value is set in the identification information setting unit, the control unit enters a second mode in which it recognizes that value as unique identification information in the network.

With the above structure, in a network such as a SAS domain where a basic storage apparatus and at least one additional storage apparatus are identified by their unique identification information, the basic storage apparatus can judge, when the additional storage apparatus is powered-on, whether or not an initial value is set in an identification information (e.g., a SAS-ID) setting unit in the additional storage apparatus, the identification information setting unit being where unique identification information in the network is set. If it is judged that an initial value is set in the identification information setting unit, the basic storage apparatus enters a test mode for use in in-plant tests, in which it creates unique identification information, replaces the initial value with the created identification information, and recognizes the created identification information as a SAS-ID in the SAS domain. Meanwhile, if it is judged that a value other than the initial value is set in the identification information setting unit, the basic storage apparatus enters a second mode for use after shipment, in which it recognizes that value as a SAS-ID in the SAS domain.

According to this invention, it is possible to provide: a storage system where, in a network regulated so that the unique identification information for a basic storage apparatus and that of each of a plurality of additional storage apparatuses do not overlap, the storage apparatuses can be connected to the network without being assigned unique identification information, effort in setting unique identification information during in-plant tests can be conserved, and human error can be prevented; and an additional storage apparatus connecting method for the storage system.

DETAILED DESCRIPTION OF PREFERRED EMBODIMENTS

This invention provides, in addition to a normal mode where post-shipment basic storage apparatuses and additional storage apparatuses are identified by their WWNs, a test mode where a SAS domain is automatically formed without having to set WWNs during an in-plant test carried out before shipping the basic storage apparatus and additional storage apparatuses. More precisely, the normal mode refers to a mode where all the apparatuses have unique SAS-IDs in the SAS domain while the test mode refers to a mode where expanders, which will be described later, have unique SAS-IDs. The storage system—additional storage apparatus connection method according to this invention includes two types of link modes, i.e., normal mode and test mode.

An embodiment of this invention will be explained below with reference to the drawings.

Figure 1:
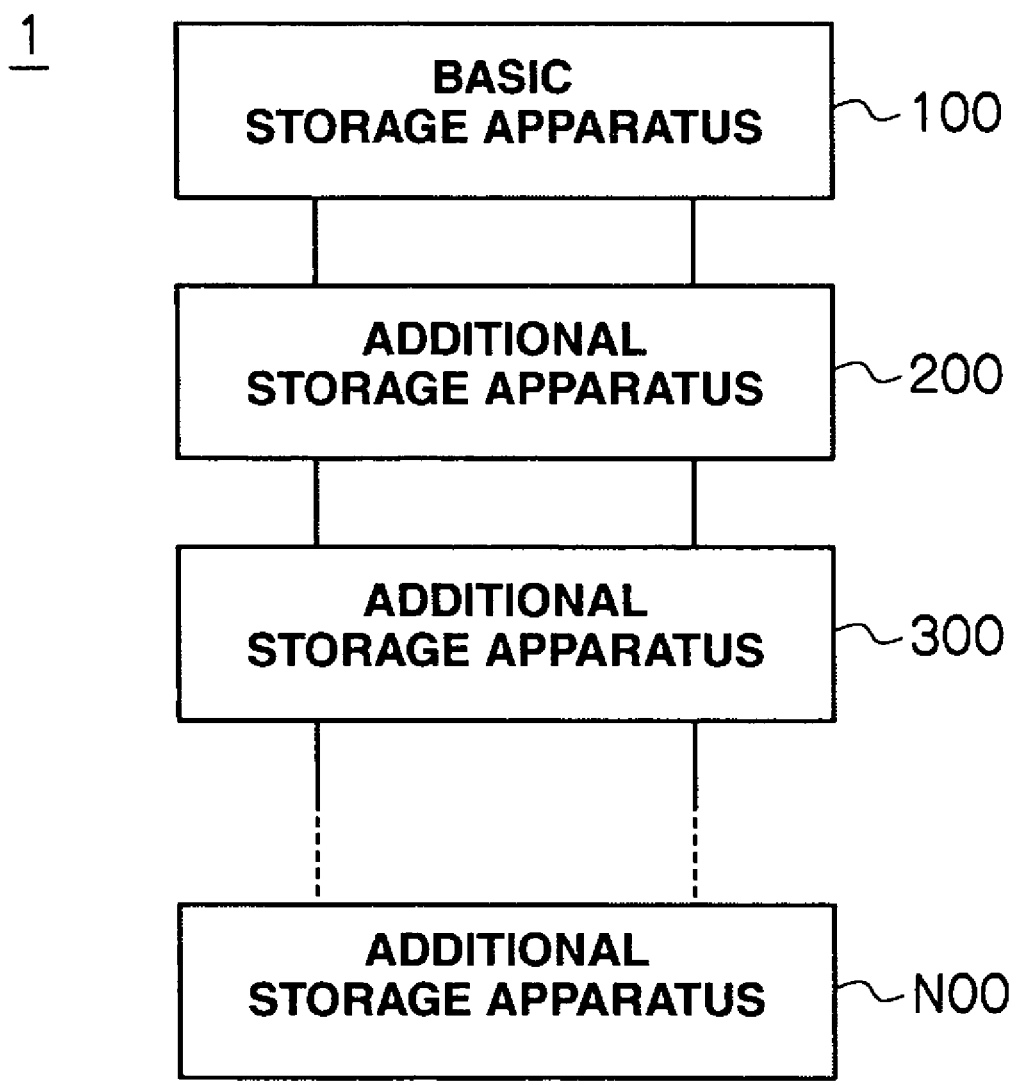
FIG. 1 is a schematic diagram showing the overall structure of a storage system according to this invention.

FIG. 1 is a schematic diagram showing the overall structure of a storage system 1 according to this invention. Expansion storage apparatuses, i.e., additional storage apparatuses (additional chassis) 200, 300 . . . N00 are chain-connected in this order to a basic storage apparatus (basic chassis) 100. Chain connection is a type of connection where one master unit has only one slave unit. The connections between the basic storage apparatus 100 and additional storage apparatus 200 and between the additional storage apparatuses (e.g., between the additional storage apparatus 200 and additional storage apparatus 300) are all SAS connections.

The architecture of the storage system 1 where the additional storage apparatuses 200 . . . N00 are connected to the basic storage apparatus 100 will be explained next with reference to FIGS. 2-5.

Figure 2:
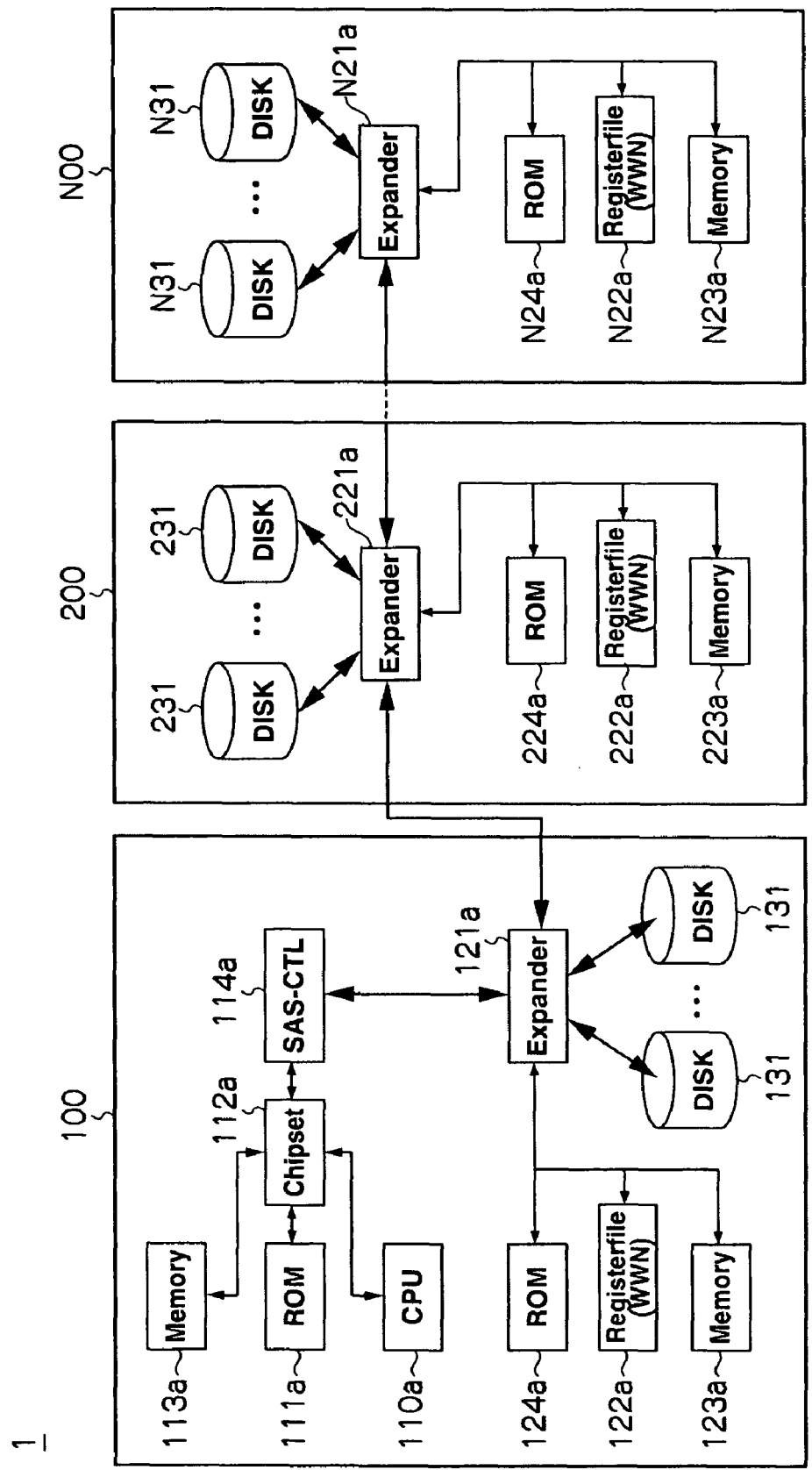
FIG. 2 is a schematic diagram illustrating the architecture according to this invention.

FIG. 2 is a schematic diagram illustrating the architecture of the storage system 1 as regards the addition of additional storage apparatuses after shipment. As shown in the drawing, the additional storage apparatuses 200 . . . N00 are chain-connected to the basic storage apparatus 100 by means of their expanders 121a, 221a . . . N21a being SAS-connected to each other. In the post-shipment normal mode, the basic storage apparatus 100 and additional storage apparatuses 200 . . . N00 are identified by their WWNs, which are set in their register files 122a, 222a . . . N22a.

Incidentally, in this embodiment, WWNs are created from the storage apparatus-identifying serial numbers that are set in the respective register files 122a, 222a, . . . N22a when the power (not shown in the drawing) of the storage apparatuses is turned on. This process will be described later. In this embodiment, when the basic storage apparatus 100 and additional storage apparatuses 200 . . . N00 are in the test mode, their serial numbers have not yet been set in their register files 122a, 222a . . . N22a, but set after an in-plant test.

Figure 3:
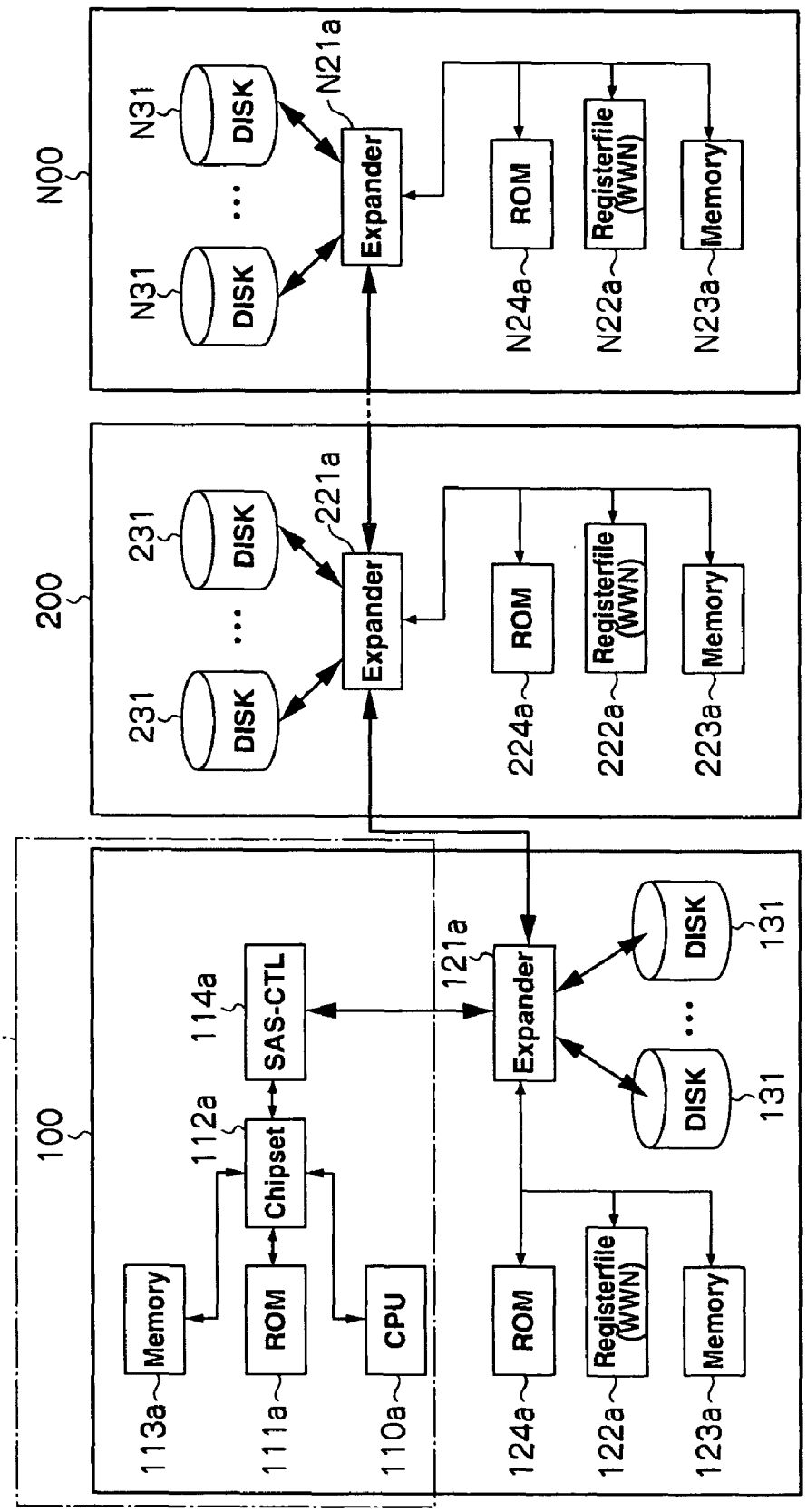
FIG. 3 is a diagram illustrating a basic controller unit according to this invention.

FIG. 3 is a diagram illustrating a basic controller unit W1 in the basic storage apparatus 100. The basic controller unit W1 controls the overall storage system 1. More precisely, it issues commands, for example, to read/write data from/in the respective SAS disks 131, 231 . . . N31.

The basic controller unit W1 is composed of a CPU (Central Processing Unit) 110a, ROM (Read Only Memory)111a, memory 113a, chipset 112a, and SAS-controller (SAS-CTL) 114a. Incidentally, the CPU110a is connected via the chipset112a to the ROM 111a, memory113a, and SAS-controller 114a.

The CPU110a runs system programs stored in the ROM111a. The ROM111a has areas for storing the system programs run by the CPU110a. The memory113a is, for example, a DIMM (Double Inline Memory Module) and has areas for running the system programs stored in the ROM111a as well as data storage areas for storing data required when the CPU110a runs the system programs. The SAS-controller 114a receives commands from the CPU 110a via the chipset 112a. It also issues SAS-commands to execute control to access data in the disk unit W2.

Figure 4:
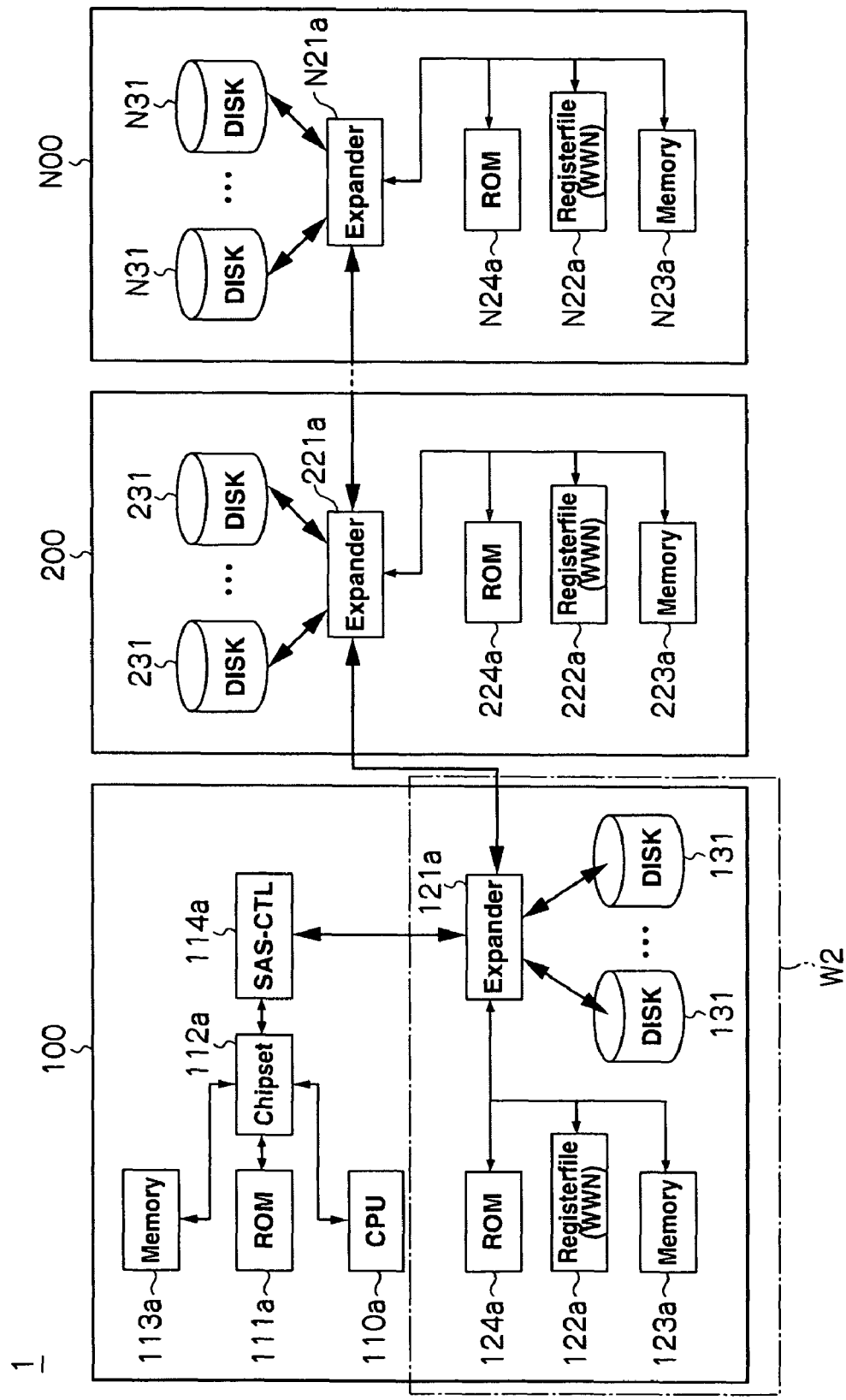
FIG. 4 is a diagram illustrating a disk unit according to this invention.

FIG. 4 is a diagram illustrating the disk unit W2. Each of the basic storage apparatus 100 and additional storage apparatuses 200 . . . N00 has a disk unit W2, so only the disk unit W2 in the basic storage apparatus 100 will be explained below. The disk unit W2 is composed of an expander 121a, register file122a, memory123a, ROM 124a, and SAS disks 131. The expander 121a is connected to the SAS-controller 114a, respective SAS disks 131, and another expander 221a in the additional storage apparatus 200. The expander 121a is also connected to the register file122a, memory123a, and ROM124a.

The expander 121a includes a CPU and runs the programs stored in the ROM 124a. By running these programs, the expander 121a can play the role of a hub (port expansion role) based on the SAS protocol. The register file122a stores a register table the expander 121a refers to, in which, for example, an initial value or SAS-ID (WWN) in the SAS domain, storage apparatus-identifying serial number (the area storing the serial number is the specific number set unit) and environmental information.

The memory123a has areas for running the programs stored in the ROM124a and areas for storing data required when running those programs. The ROM124a is, for example, a flash ROM and has areas for storing the programs run by the expander 121a.

Figure 5:
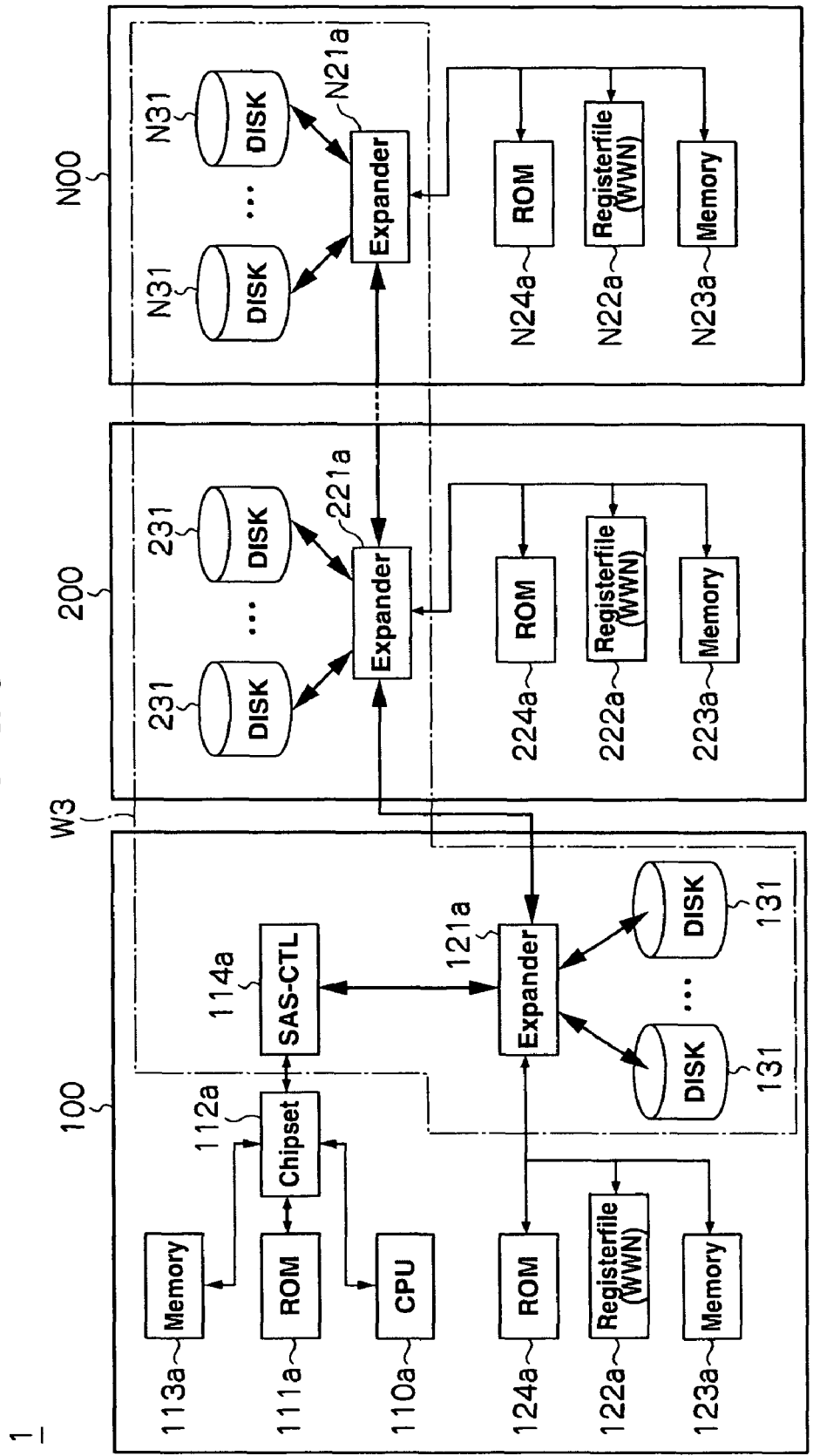
FIG. 5 is a diagram illustrating a SAS domain according to this invention.

FIG. 5 is a diagram illustrating the SAS domain. The SAS domain is a network, which can be controlled based on SAS standard (protocol) and is composed of constituent elements: the SAS-controllers, expanders, and SAS disks. Each element has a respective SAS-ID for identifying itself in the SAS domain. A network W3 is formed with the SAS-controller 114a serving as a root. The network W3 is composed of the SAS-controller 114a, expanders 121a, 221a . . . N21a, and respective SAS disks 131, 231 . . . N31. Each of them has memory for storing its own unique SAS-ID. Incidentally, each expander 121a, 221a . . . N21a has a port expansion function and is capable of expanding the disks with SAS disks that can be connected via the expanders.

In this way, in the storage system 1, the CPU 110a can identify the SAS-controller 114a, expanders 121a, 221a . . . N21a, and respective SAS disks 131, 231 . . . N31 with their SAS-IDs set in the register files122a, 222a . . . N22a, the SAS-IDs being the domains in the SAS network.

Figure 9:
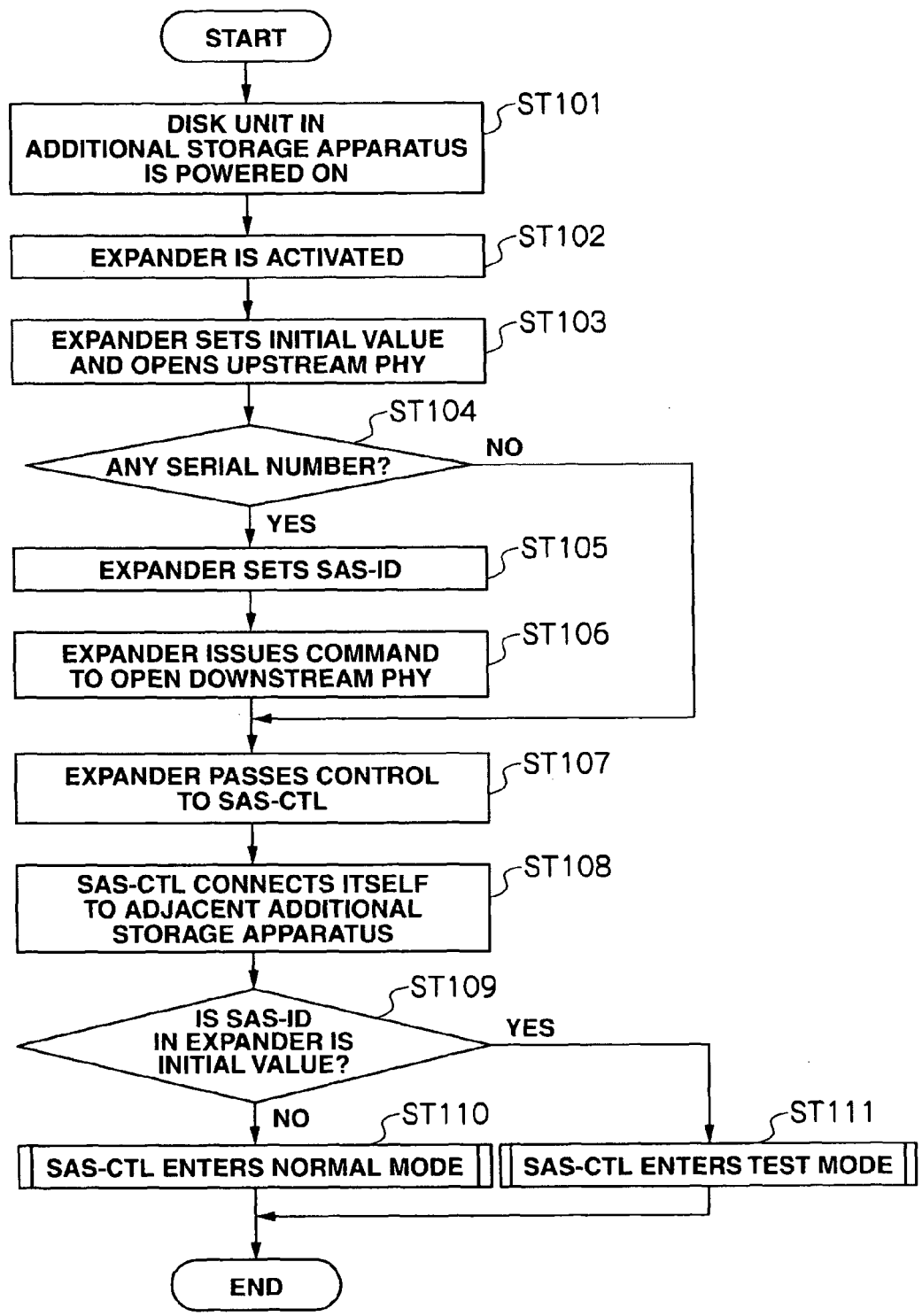
FIG. 9 is a flowchart explaining determination process, according to this invention, for determining which mode— normal mode or test mode—to enter.

Determination processing performed in the storage system 1 to determine in which mode—normal mode or test mode—the identification of the additional storage apparatus 200 is performed will be explained below. FIG. 9 is a flowchart explaining the main part of the determination processing. Incidentally, the same processing is performed when another additional storage apparatus is connected, so an explanation will be given only for the case where the additional storage apparatus 200 is added to the basic storage apparatus 100.

Where the basic storage apparatus 100 is in its ON state (i.e., the state where the expander 121a and other elements are operating), when the power (not shown in the drawing) for the disk unit in the additional storage apparatus 200 is turned on (ST101), the expander 221a in the additional storage apparatus 200 is activated (ST102).

The expander 221a sets an initial value for its SAS-ID and opens its upstream PHY (port) (ST103). Then it judges whether or not there is a storage apparatus-identifying serial number in its register file 222a (ST104). In other words, it judges whether or not the serial number of the additional storage apparatus 200 is set in its register file 222a. At the pre-shipment in-plant test stage, the judgment in step ST104 is negative (NO) because a serial number is not set yet, but, in the post-shipment stage, the judgment is positive (YES) because a serial number is set.

When it is judged that there is a serial number (ST104: YES), the expander 221a creates a new SAS-ID using that serial number, replaces the initial value with the created SAS-ID, and sets the created SAS-ID in the expander 221a (ST105). It then opens its downstream PHY (port) (ST106).

When the downstream PHY is opened in step ST106, or, when it is judged that there is no serial number (ST104: NO), the expander 221a passes control to the SAS-controller 114a (ST107).

The SAS-controller 114a connects itself to the additional storage apparatus 200 (ST108). It then judges whether or not the SAS-ID set in the expander 221a in the additional storage apparatus 200 is its initial value (ST109).

If the SAS-controller 114a judges that the SAS-ID is not its initial value (ST109: NO), it enters the normal mode (ST110). Meanwhile, if it judges that the SAS-ID is its initial value (ST109: YES), it enters the test mode (ST111). The respective processes performed in the normal mode and test mode will be explained below.

Figure 10:
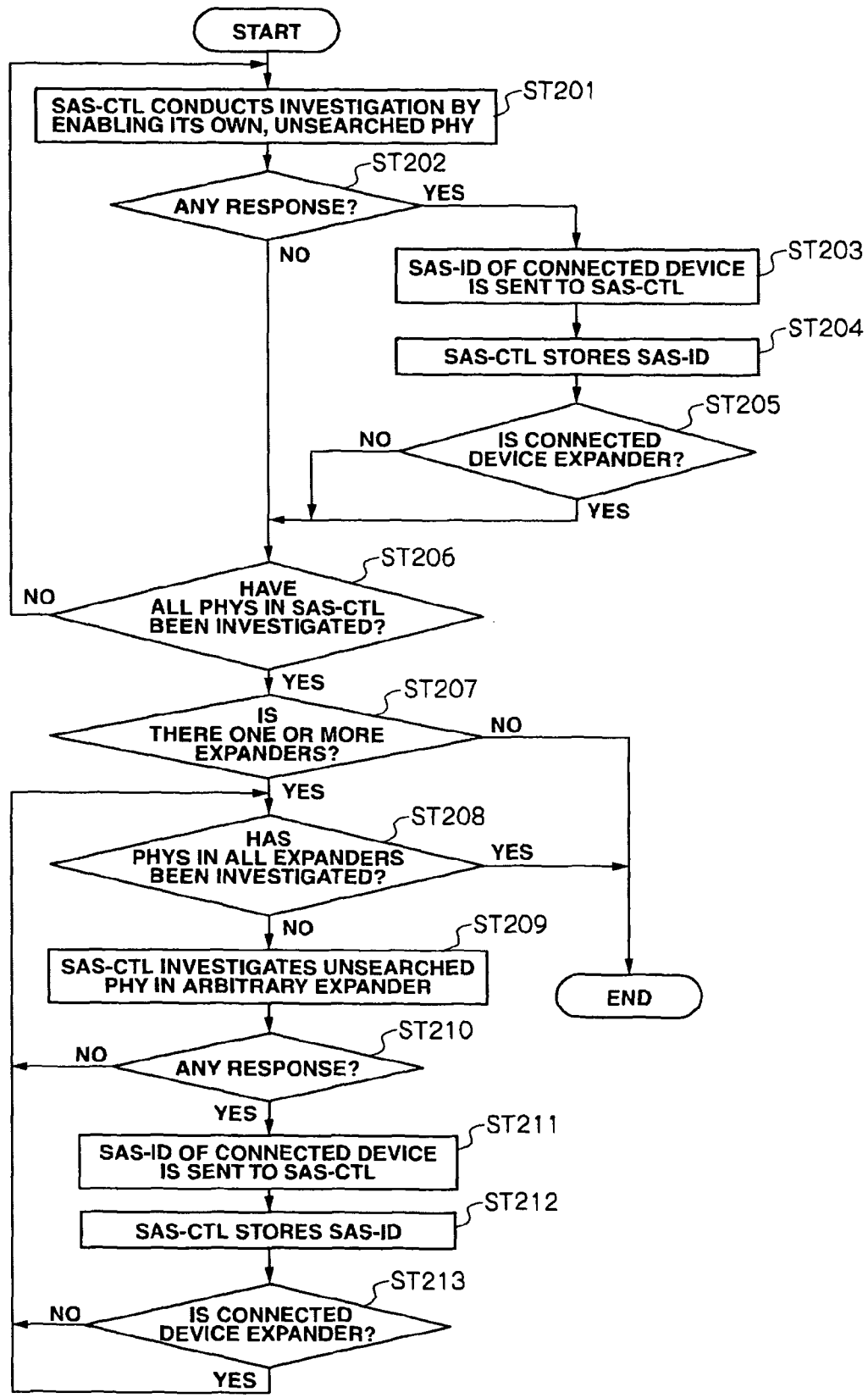
FIG. 10 is a flowchart explaining the SAS domain establishment algorithm in the normal mode according to this invention.

First, the normal mode will be explained below with reference to FIG. 10. FIG. 10 is a flowchart explaining the SAS domain establishment algorithm in the normal mode.

The SAS-controller 114a conducts investigation by enabling its own, unsearched PHY (ST201). Note that, both here and in the descriptions below, investigation is to investigate the SAS-ID of a connected device and also investigate whether or not the connected device is an expander or a SAS disk.

The SAS-controller 114a judges whether or not it has received a response from any PHY (ST202). If there is a response from a PHY (ST202: YES), the SAS-ID of the connected device is sent to the SAS-controller 114a (ST203). The SAS-controller 114a stores that SAS-ID (ST204). It then judges whether or not the connected device is an expander or not (ST205). Incidentally, the SAS-ID and the result of this judgment are stored, for example, in the memory, which is a setting unit in the SAS-controller 114a.

Meanwhile, if there is no response from any PHY (ST202: NO), or, after the judgment in step ST205, the SAS-controller 114a judges whether or not it has investigated all of its PHYs (ST206). If all the PHYs have not been investigated (ST206: NO), the process returns to step ST201.

Meanwhile, when all the PHYs in the SAS-controller 114a have been investigated (ST206: YES), the SAS-controller 114a judges whether or not there are any expanders (ST207). If there are no expanders (ST207: NO), it means that no expander exists in the SAS domain, so the process is terminated.

Meanwhile, when there is one or more expanders (ST207: YES), the SAS-controller 114a judges whether or not it has investigated the PHYs in all the expanders (ST208). If it has not investigated all the PHYs (ST208: NO), it investigates an unsearched PHY in an arbitrary expander (ST209). Then it judges whether or not it has received a response from that PHY (ST210).

If the SAS-controller 114a has received a response from the PHY (ST210: YES), the SAS-ID of the connected device is sent to the SAS-controller 114a (ST211). The SAS-controller 114a then stores that SAS-ID (ST212). It then judges whether or not the connected device is an expander (ST213). Incidentally, the SAS-ID and the result of this judgment are stored, for example, in the memory, which is the setting unit in the SAS-controller 114a.

When there is no response (ST210: NO), or, after the judgment in step ST213, the process returns to step ST208. When the SAS-controller 114a judges that it has investigated the PHYs in all the expanders (ST208: YES), a SAS domain is formed and so the process is terminated.

The SAS connection is thus realized between the basic storage apparatus 100 and additional storage apparatus 200 and the same process is performed between the additional storage apparatuses 300-N00, thereby, a SAS domain, in which the SAS-controller 114a is a root, is formed as shown in FIG. 5.

Figure 11:
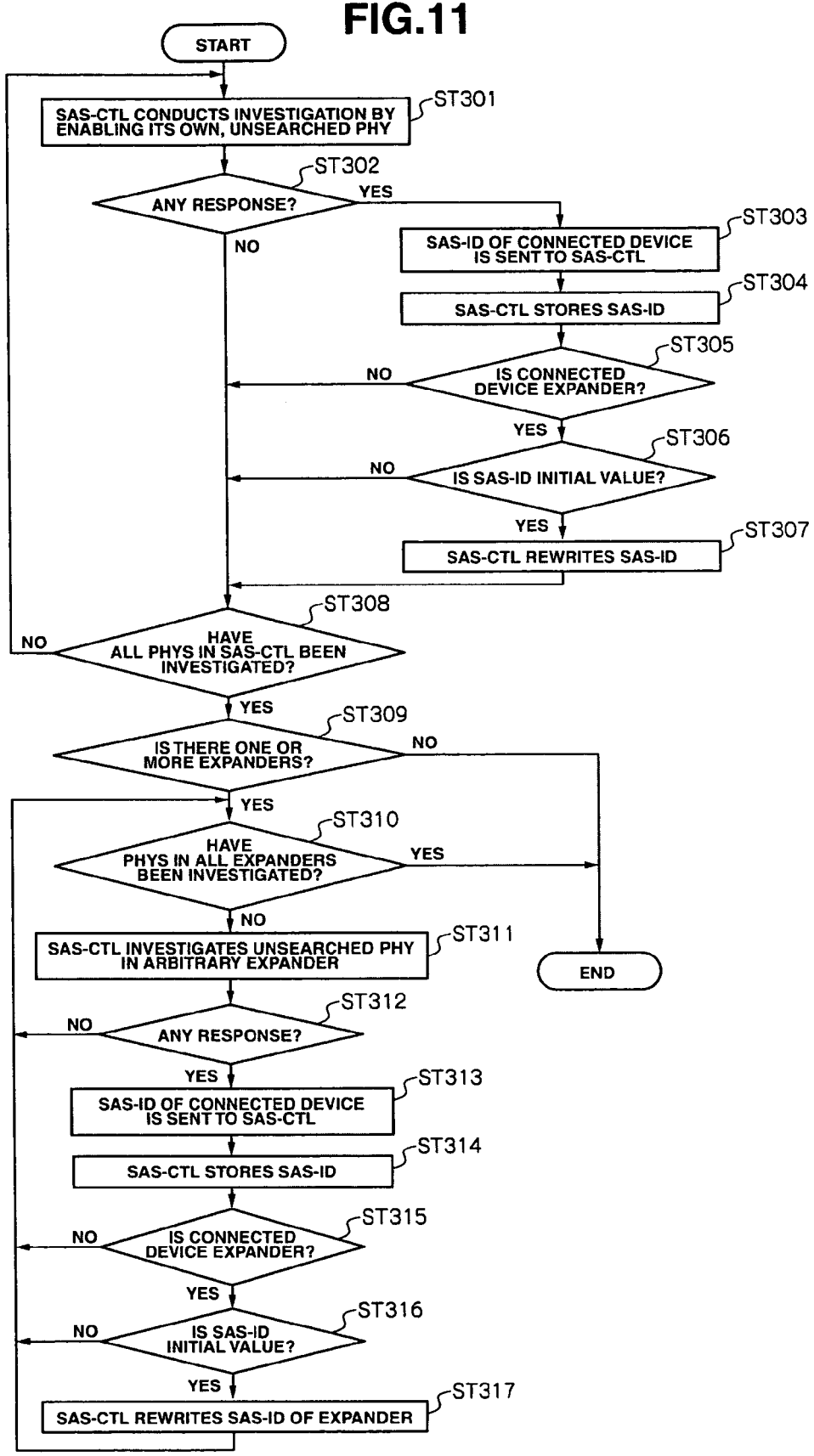
FIG. 11 is a flowchart explaining the SAS domain establishment algorithm in the test mode according to this invention.

The test mode will be explained below with reference to FIG. 11. FIG. 11 is a flowchart explaining the SAS domain establishment algorithm in the test mode.

The SAS-controller 114a conducts investigation by enabling its own unsearched PHY (ST301). It then judges whether or not it has received a response from that PHY (ST302). If it has received a response from the PHY (ST302: YES), the SAS-ID of the connected device is sent to the SAS-controller 114a (ST303). The SAS-controller 114a then stores that SAS-ID (ST304). It then judges whether or not the connected device is an expander (ST305). If it judges that the connected device is an expander (ST305: YES), it also judges whether or not the SAS-ID of the expander is its initial value (ST306). If it judges that the SAS-ID is its initial value (ST306: YES), it rewrites the SAS-ID (ST307). More precisely, the SAS-controller 114a issues a command to the expander to change its SAS-ID from the initial value to a unique identification number. The unique identification number only has to be an unique identification number in the SAS domain.

If there is no response from the PHY (ST302: NO), when the judgment in step ST305 or ST306 is negative, or after step ST307, the SAS-controller 114a judges whether or not it has investigated all of its PHYs (ST308). If all the PHYs have not been investigated (ST308: NO), the process returns to step ST301.

Meanwhile, if all the PHYs in the SAS-controller 114a have been investigated (ST308: YES), the SAS-controller 114a judges whether or not there are any expanders (ST309). If there are no expanders (ST309: NO), it means that no expander exists in the SAS domain, so the process is terminated.

Meanwhile, if there are any expanders (ST309: YES), the SAS-controller 114a judges whether or not it has investigated the PHYs in all the expanders (ST310). If it has not investigated all the PHYs (ST310: NO), it investigates an unsearched PHY in an arbitrary expander (ST311). It then judges whether or not it has received a response from that PHY (ST312).

If there has been a response from the PHY (ST312: YES), the SAS-ID of the connected device is sent to the SAS-controller 114a (ST313). The SAS-controller 114a then stores that SAS-ID (ST314). It then judges whether or not the connected device is an expander (ST315). If it judges that the connected device is an expander (ST315: YES), it further judges whether or not the SAS-ID of the expander is its initial value (ST316). If it judges that the SAS-ID is its initial value (ST316: YES), it rewrites the SAS-ID of the expander (ST317). More precisely, it issues a command to the expander to changes its SAS-ID from its initial value to a unique identification number. The unique identification number only has to be a unique identification number in the SAS domain.

If there has been no response (ST312: NO), if the judgment is negative in step ST315 or ST316, or, after the SAS-ID is rewritten in step ST317, the process returns to step ST310. When the SAS-controller 114a judges that it has investigated the PHYs in all the expanders (ST310: YES), a SAS domain is formed and so the process is terminated.

In this way, SAS connection is realized between the basic storage apparatus 100 and additional storage apparatuses 200 . . . -N00 and so a SAS domain, in which the SAS-controller 114 is a root, is automatically formed, without having to set SAS-IDs.

Figure 6:
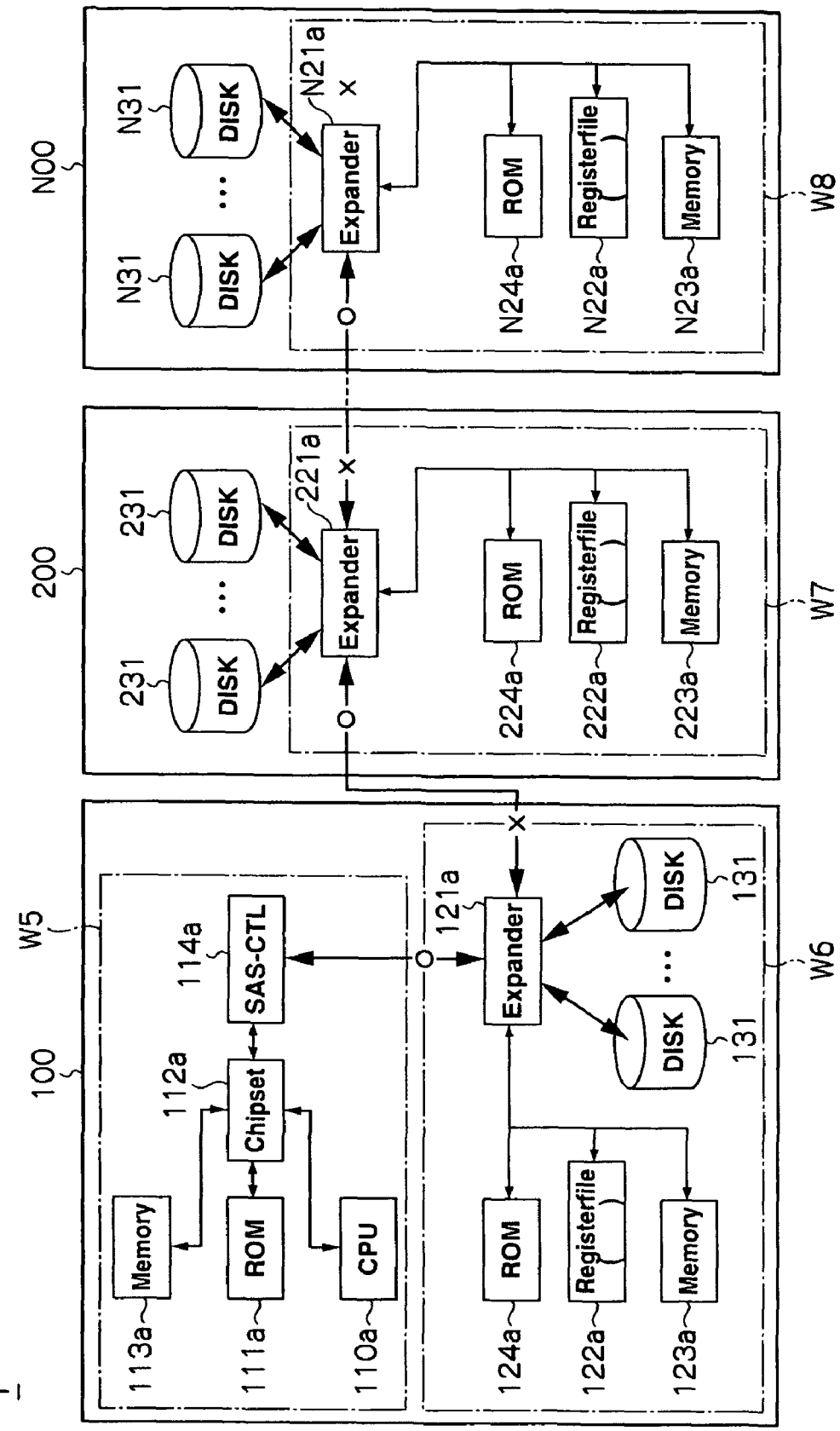
FIG. 6 is a diagram illustrating the formation, according to this invention, of the SAS domain in a test mode.
Figure 7:
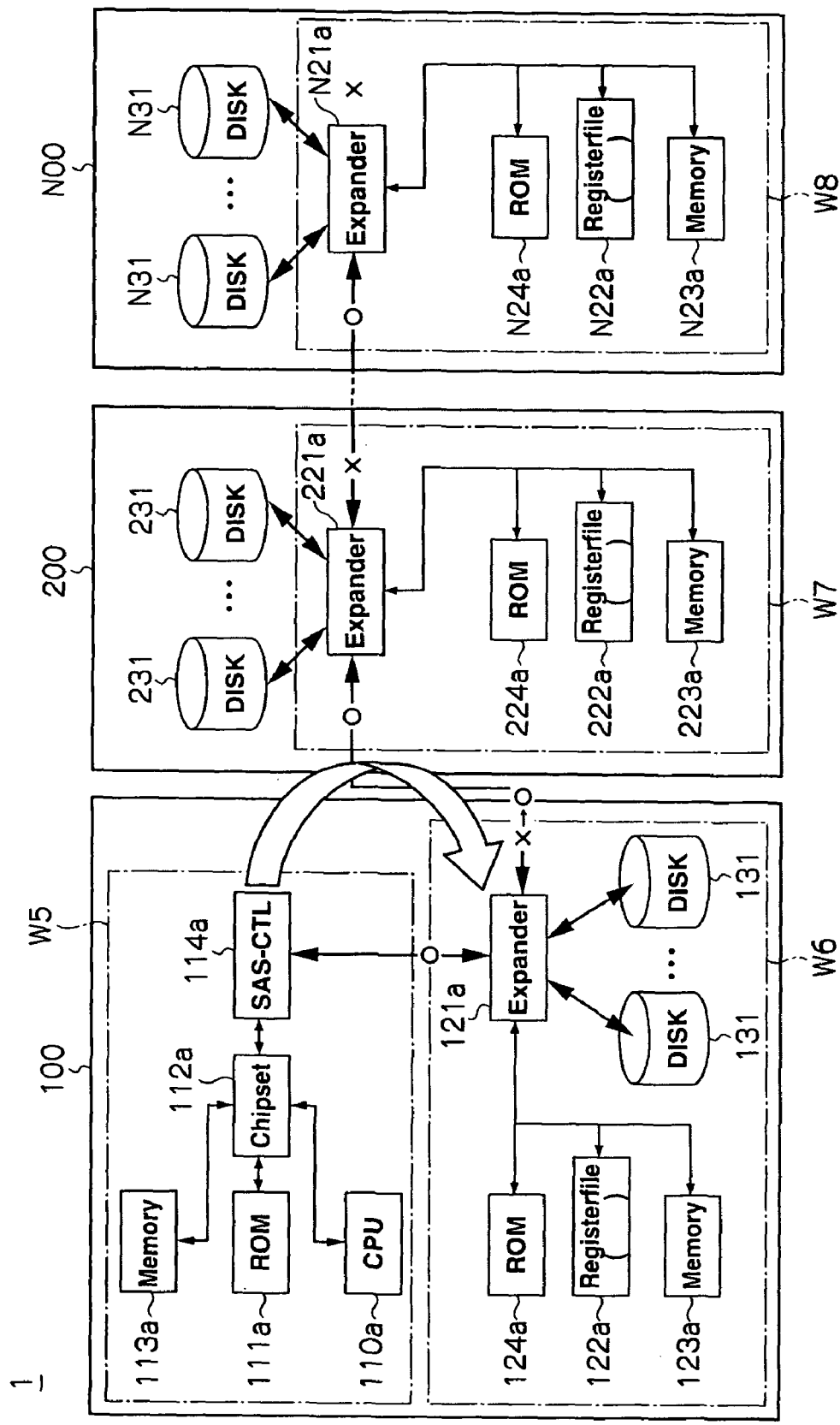
FIG. 7 is a diagram also illustrating the formation, according to this invention, of the SAS domain in the test mode.
Figure 8:
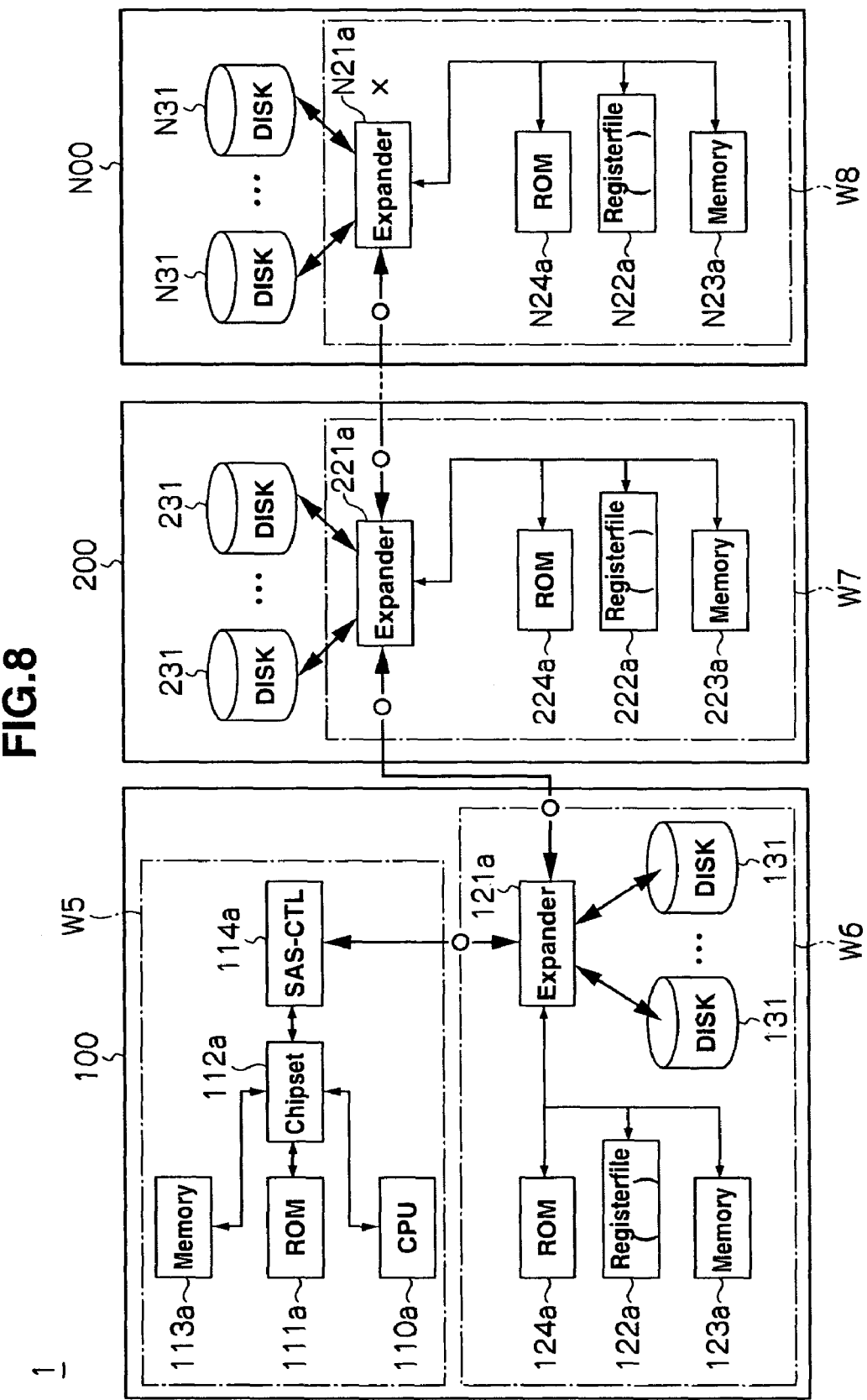
FIG. 8 is a diagram also illustrating the formation, according to this invention, of the SAS domain in the test mode.

The formation of a SAS domain in the test mode will be explained below with reference to FIGS. 6-8. FIGS. 6-8 are diagrams explaining the formation of a SAS domain.

As shown in FIG. 6, the basic storage apparatus 100 and additional storage apparatuses 200 . . . N00 are chain connected and, when the power for each apparatus is turned on, initial values are set as the SAS-IDs of the expanders 121a, 221a . . . N00a because they have no storage apparatus-identifying serial number set. The expanders 121a, 221a . . . N00a are not SAS-connected to each other. Incidentally, the reference code W5 indicates a controller unit and the reference codes W6, W7, and W8 indicate disk units.

As shown in FIG. 7, the SAS-controller 114a investigates all the PHYs in the expander 121a in order to identify the expander 121a, changes the SAS-ID of the expander 121a from its initial value to unique identification information, and SAS-connects itself to the expander 121a.

After the investigation of all the PHYs in the expander 121a is complete, the SAS-controller 114a then investigates all the PHYs in the expander 221a to identify it. It changes the SAS-ID of the expander 221a from its initial value to unique identification information. After the investigation of all the PHYs in the expander 221a is complete, it then investigates a downstream expander (expander 321a). By repeating this process, as shown in FIG. 8, SAS connection is realized until the additional storage apparatus N00 is reached, forming a SAS domain in which the SAS-controller 114a is a root.

As explained above, in the storage system 1 where the basic storage apparatus 100 and additional storage apparatuses 200 . . . N00 are SAS-connected and identified by their SAS-IDs, the additional storage apparatuses 200-N00 have the expanders 221a-N21a, which are the processing units including setting units where the unique identification information in the SAS connection is set. The basic storage apparatus 100 has a SAS-controller 114a that enters, when an additional storage apparatus 200 . . . N00 is powered on, if an initial value is set in its setting unit, a test mode in which the SAS-controller 114a creates unique identification information, replaces the initial values with the created unique identification information, and recognizes the created unique identification information as the SAS-IDs in the SAS connection. Meanwhile, if a value other than an initial value is set in the setting unit, the SAS-controller 114a enters a normal mode in which it recognizes those values as the SAS-IDs in the SAS connection.

Accordingly, it is possible to automatically form a SAS domain with the SAS-controller 114a in the basic storage apparatus 100 being a root, without having to set unique identification information in the register files 122a . . . N22a, the SAS domain being formed as a SAS domain regulated so that the unique identification information for the basic storage apparatus 100 and that for the additional storage apparatuses 200 . . . N00 do not overlap. In other words, with the storage system 1, a SAS domain can be structured without giving SAS-IDs to the basic storage apparatus 100 and additional storage apparatuses 200 . . . N00.

Accordingly, it is unnecessary for an operator to manually set unique identification information, such as WWNs, for the basic storage apparatus 100 and additional storage apparatuses 200 . . . N00, so it is possible to conserve effort and prevent human error, such as giving wrong unique identification information during an in-plant test.

Moreover, it becomes unnecessary to give WWNs to those additional storage apparatuses that have been judged as defective products as a result of the in-plant test.

The above embodiment was explained for the case where this invention is applied to a basic storage apparatus 100 and additional storage apparatuses 200 . . . N00 structured as shown in FIG. 1. However, this invention is not limited to this case and can be widely applied to a basic storage apparatus and additional storage apparatuses having various other structures.

Moreover, the above embodiment was explained for the case where the basic storage apparatus 100 and the additional storage apparatuses 200 . . . N00 are chain-connected, but expansion is not limited to the chain connection. This invention can also be applied to the case where, for example, the additional storage apparatuses are added in a tree-type structure.

FIG. 14 is a flowchart showing the search algorithm in the test mode where the additional storage apparatuses are connected in a tree-type structure. Incidentally, as the initial settings for the SAS connection network, conditions are set so that the SAS-IDs of the SAS-controller and expanders are different, the upstream PHYs in the expanders are opened, the downstream PHYs are closed, and the expanders have the same initial value.

Figure 12:
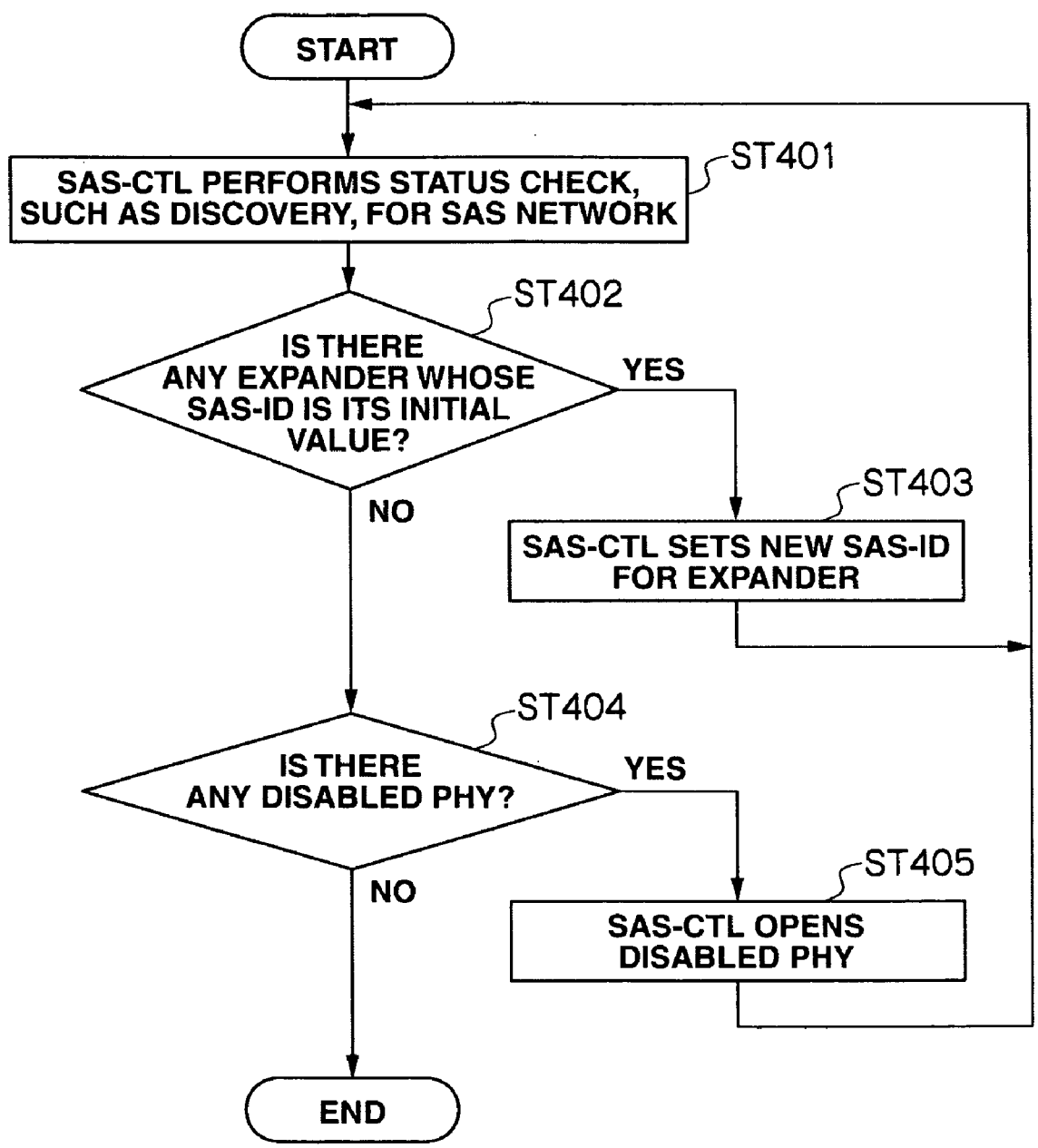
FIG. 12 is a flowchart explaining a search algorithm, according to this invention, used when additional storage apparatuses are connected in a tree-type structure.

As shown in FIG. 12, the SAS-controller 114a performs a status check, such as discovery, for the SAS network (ST401). The status check is to find out whether or not there is a closed PHY and whether or not there is any expander whose SAS-ID is its initial value.

The SAS-controller 114a judges whether or not there is an expander whose SAS-ID is its initial value (ST402). If there is such an expander as above (ST402: YES), it sets a new SAS-ID for that expander (ST403). As a new SAS-ID, a SAS-ID other than those already used in the SAS connection is used. The process then returns to step ST401.

Meanwhile, if there is no expander whose SAS-ID is its initial value (ST402: NO), the SAS-controller 114a judges whether or not there is any disabled PHY (ST404). If there is such a PHY as above (ST404: YES), it opens it (ST405). Then, the process returns to step ST401.

The process from step ST401 to ST405 is repeated, and when it is judged that there is no disabled PHY in step ST404 (ST404: NO), the process is terminated.

With this process, an expander search, which is performed to form a SAS domain, can be carried out in the test mode where the additional storage apparatuses are connected to the basic storage apparatus in a tree-type structure.

This invention can be widely applied to storage systems where additional storage apparatuses are provided.

What is claimed is:

1. A storage system comprising:
a basic storage apparatus including a SAS controller, a first SAS expander connected to said SAS controller, and a plurality of first disk devices connected to said first SAS expander; and
at least one additional storage apparatus including a second SAS expander, a plurality of second disk drives connected to the second SAS expander, and a register file;
wherein the first expander included in the basic storage apparatus and the second SAS expander included in the additional storage apparatus are connected to each other via a network;
wherein when the additional storage apparatus is powered-on, the second SAS expander sets an initial value as a SAS identification information of the second SAS expander,
wherein the second SAS expander determines whether a serial number of the additional storage apparatus is stored in the register file,
wherein the second SAS expander, if the serial number of the additional storage apparatus is stored in the register file, creates a first unique identification information using the serial number, and replaces the initial value with the created first unique identification information,
wherein the first SAS expander included in the basic storage apparatus determines whether the SAS identification information of the second SAS expander is the initial value,
wherein, if the SAS identification information of the second SAS expander is the initial value the first SAS expander in the basic storage apparatus creates a second unique identification information, replaces the initial value with the created second identification information, and recognizes the created second identification information as the SAS identification information of the second SAS expander in the network and,
wherein if the SAS identification information of the second SAS expander is not the initial value the first SAS expander recognizes the created first unique identification information as the SAS identification information of the second SAS expander in the network.

2. The storage system according to claim 1,
wherein the second SAS expander opens an upstream port and,
wherein, if the second SAS expander replaces the initial value with the created first unique identification information the second SAS expander also opens a downstream port; and
the first SAS expander communicates with the second SAS expander through the opened upstream port or the opened downstream port.

3. The storage system according to claim 1, wherein:
when there are two or more additional storage apparatuses, they are chain-connected to the basic storage apparatus; and
if the SAS identification information of the second SAS expander is the initial value the initial values in the additional storage apparatuses are replaced with the created second unique identification information in the order of chain connection.

4. An additional storage apparatus connection method for a network where a basic storage apparatus includes a SAS controller, a first SAS expander connected to said SAS controller, and a plurality of first disk devices connected to said first SAS expander, and at least one additional storage apparatus includes a second SAS expander, a plurality of second disk drives connected to the second SAS expander, and a register file, wherein the method comprises the steps of:
setting, by the second SAS expander, an initial value as a SAS identification information of the second SAS expander;
determining, by the second SAS expander, whether a serial number of the additional storage apparatus is stored in the register file;
creating, by the second SAS expander, a first unique identification information using the serial number and replacing the initial value with the created first unique identification information, if the serial number of the additional storage apparatus is stored in the register file;
determining, by the first SAS expander, whether the SAS identification information of the second SAS expander is the initial value;
creating, if the SAS identification information of the second SAS expander is the initial value a second unique identification information, and replacing the initial value with the created second identification information, and recognizing the created second identification information as the SAS identification information of the second SAS expander in the network, by the first SAS expander; and recognizing, if the SAS identification information of the second SAS expander is not the initial value the created first unique identification information as the SAS identification information of the second SAS expander in the network, by the first SAS expander.

5. The additional storage apparatus connection method according to claim 4, further comprising the steps of:

opening, by the second SAS expander, an upstream port; and opening, by the second SAS expander, a downstream port, if the SAS identification information of the second SAS expander is the initial value, wherein the first SAS expander communicates with the second SAS expander through the opened upstream port or the opened down stream port.

6. The additional storage apparatus connection method according to claim 4, wherein:

when there are two or more additional storage apparatuses, they are chain-connected to the basic storage apparatus; and if the SAS identification information of the second SAS expander is the initial value, the initial values in the additional storage apparatuses are replaced with the second created unique identification information in the order of chain connection.

* * * * *